Dec. 8, 1925.
H. W. AVERY
PIPE THREAD PROTECTOR
Filed Feb. 5, 1923
1,564,315
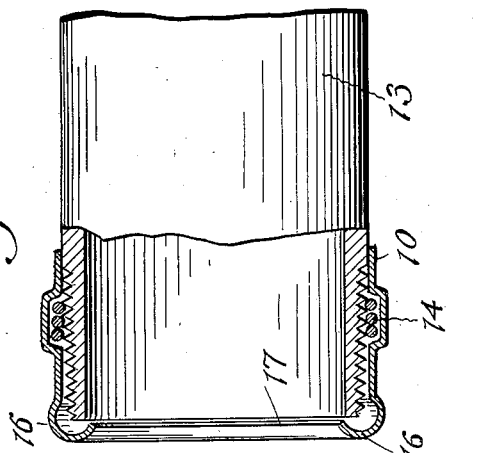
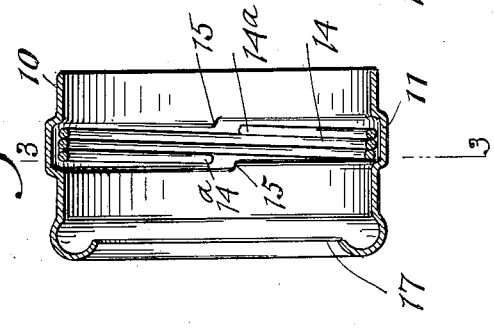
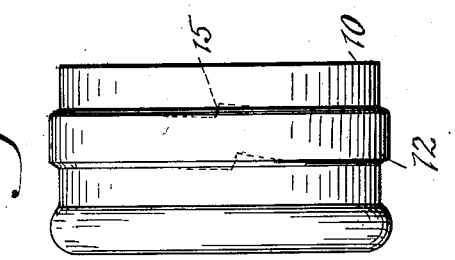
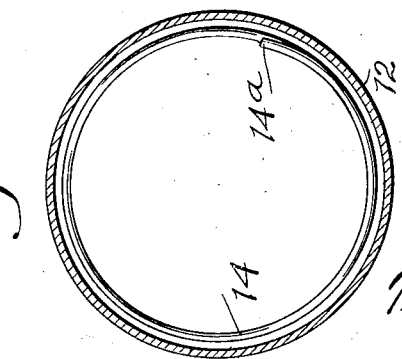
Inventor
Henry W. Avery
by
Thurston Kwis & Hudson
attys Patented Dec. 8, 1925.

1,564,315

UNITED STATES PATENT OFFICE.

HENRY W. AVERY, OF CLEVELAND, OHIO.

PIPE-THREAD PROTECTOR.

Application filed February 5, 1923. Serial No. 617,156.

*To all whom it may concern:*

Be it known that I, HENRY W. AVERY, a citizen of the United States, residing at Cleveland, in the county of Cuyahoga and State of Ohio, have invented a certain new and useful Improvement in Pipe-Thread Protectors, of which the following is a full, clear, and exact description.

This invention relates to a pipe thread protector and has for its chief object to provide a protector which can be produced inexpensively, and which can be readily applied to and removed from the threaded end of a pipe, which will thoroughly protect the threads, and which will not come off under the action of continued chattering or vibration.

In carrying out my invention I provide a protector in the form of a sleeve provided on the interior with a wire coil or a section of coiled wire of any desired number of convolutions, which are adapted to engage and screw onto the thread of the pipe. The section of coiled wire is preferably located in a recess on the inner surface of the sleeve, which recess retains the coil but holds it with a loose fit, and suitable stops are provided adapted to be engaged by the ends of the coil so as to prevent the latter turning within the sleeve.

The invention may be further briefly summarized as consisting in certain novel details of construction and combinations and arrangements of parts which will be described in the specification and set forth in the appended claims.

In the accompanying sheet of drawings, Fig. 1 is an elevation of my improved pipe protector embodying one form of the invention; Fig. 2 is a longitudinal sectional view of the same; Fig. 3 is a transverse sectional view substantially along the line 3—3 of Fig. 2; and Fig. 4 shows a protector applied to a pipe, the protector and a portion of the pipe being in section.

The pipe protector includes a metal sleeve 10 which may be formed of different materials, such as sheet metal, as is generally the case, or it may be formed of cast metal.

Between the ends of the sleeve an inner annular recess 11 is formed. Generally the recess will be formed by spinning or pressing the metal outwardly forming an external corrugation 12. There is a distinct advantage in forming the external corrugation to produce the recess 11, although it will be understood, of course, that when unusually heavy gauge metal or cast metal is used the recess 11 may be machined in the sleeve or it may be cast in it.

The sleeve is not threaded on the interior, but in order that it may be screwed into the end of a pipe, such as shown at 13 in Fig. 4, there is provided inside the recess 11 a section of coiled wire 14. In this instance the coil has three turns or convolutions, but the number may be varied as desired. This coil 14 is not attached to the sleeve but normally lies loose in the recess 11, and may be termed a floating coil, as it is desired at least initially that there be loose play between the coil and the sleeve, but not sufficient play, however, that it is possible for the coil to accidentally drop out of the recess.

As an additional important feature, stops or shoulders 15 are provided adapted to be engaged by the ends 14ª of the coil 14, so as to prevent the coil from having any more than a very limited rotary movement within the sleeve. In other words, these stops or shoulders will enable the protector to be screwed onto the pipe and to be removed therefrom when unscrewed.

I prefer also that the outer end of the sleeve be bowed outwardly forming the second corrugation 16, and that the extreme end be curved inwardly as shown at 17, this serving to protect the end of the pipe or entering thread in the event of a blow on the extreme end of the sleeve.

The coil is preferably somewhat smaller than the pipe thread so that when the sleeve is slipped onto the threaded end of the pipe and then turned the wire will enter the groove of the thread and follow along the thread, and as the sleeve is moved along, the wire is expanded somewhat so as to tightly grip the thread. When the sleeve is the full distance on the threaded end of the pipe the coil will be expanded so as to extend substantially to the wall of the recess 11. There is still, however, preferably a slight degree of play between the coil and the sleeve, this being desirable to avoid liability of vibration working the protector off the pipe. That is to say, regardless of the amount of vibration the coil will tightly hub the thread and remain in place, and thereby retain the sleeve in place. However, the shoulders 15 by limiting the turning movement of the coil in the sleeve make it possible to screw the protector the full distance onto the pipe or to remove it.

The corrugations 12 and 16 strengthen the sleeve and minimize the liability of the pipe thread being injured by blows delivered to the sleeve.

The coiled wire 14 is here shown round in cross section, but it may be otherwise shaped. For example, it may be oval shaped, as may be desired in some instances.

Having described my invention, I claim:

1. A pipe thread protector comprising a sleeve having on the interior between the ends thereof an annular recess, and a section of coiled wire loosely seated in the recess.

2. A pipe thread protector comprising a sleeve having an annular space on the interior and a section of coiled wire loosely seated in said space, and a pair of shoulders adapted to be engaged by the ends of the wire to limit the circumferential movement thereof and to permit the protector to be screwed onto and off a pipe.

3. A pipe thread protector comprising a sleeve having an external corrugation forming an inner annular recess, and a section of coiled wire comprising more than one convolution end loosely seated in the recess.

4. A pipe thread protector comprising a sleeve having an external corrugation forming an inner annular recess, and a section of coiled wire loosely seated in the recess, shoulders being provided to be engaged by the ends of the wire to limit the circumferential movement thereof.

5. A pipe thread protector comprising a sleeve having on the interior an annular recess, and a section of coiled wire seated in the recess, the free end of the sleeve being bowed outwardly and curved in so as to extend into the interior of a pipe on which the sleeve is fitted.

6. A pipe thread protector comprising a sleeve having on the interior and between the ends thereof an annular recess, and a section of coiled wire loosely seated in the recess and constrained by the sleeve to rotate therewith when the protector is screwed onto and off a pipe.

In testimony whereof, I hereunto affix my signature.

HENRY W. AVERY.